US00RE37969E

(19) United States
(12) Reissued Patent
Horton et al.

(10) Patent Number: US RE37,969 E
(45) Date of Reissued Patent: Jan. 28, 2003

(54) OPTICAL DISPLACEMENT SENSOR AND TORQUE SENSOR EMPLOYING RELATIVELY MOVABLE SLIT PATTERNS

(75) Inventors: Steven John Horton, West Midlands (GB); Adrian Leslie Trace, Birmingham (GB); David Rees, West Midlands (GB)

(73) Assignee: TRW Lucas Variety Electric Steering Limited, Wednesbury (GB)

(21) Appl. No.: 09/717,942

(22) PCT Filed: Aug. 25, 1995

(86) PCT No.: PCT/GB95/02017

§ 371 (c)(1), (2), (4) Date: May 9, 1997

(87) PCT Pub. No.: WO96/06330

PCT Pub. Date: Feb. 29, 1996

Related U.S. Patent Documents

Reissue of:
(64) Patent No.: 5,841,132
Issued: Nov. 24, 1998
Appl. No.: 08/793,404
Filed: May 9, 1997

(30) Foreign Application Priority Data

Aug. 25, 1994 (GB) ..... 9417190
Feb. 18, 1995 (GB) ..... 9503193

(51) Int. Cl.[7] ..... G01D 5/34
(52) U.S. Cl. ..... 250/231.13; 250/231.17; 341/13

(58) Field of Search ..... 250/208.1, 231.13, 250/231.14, 231.16, 231.17, 237 G; 341/11, 13, 31; 356/614, 616, 617

(56) References Cited

U.S. PATENT DOCUMENTS 4,678,908 A * 7/1987 LaPlante ..... 250/231.14
5,317,149 A * 5/1994 Uebbing et al. ..... 250/231.14
5,438,193 A * 8/1995 Takagi et al. ..... 341/13

FOREIGN PATENT DOCUMENTS

DE 9012171 * 10/1990
EP 0185619 * 6/1986
EP 0194930 * 9/1986
EP 0555987 A2 * 8/1993
EP 0555987 * 8/1993
RU 517815 * 8/1976
RU 1364918 A * 1/1998

* cited by examiner

*Primary Examiner*—Stephone Allen
(74) *Attorney, Agent, or Firm*—Cesari and McKenna, LLP

(57) ABSTRACT

An optical displacement sensor is used to measure the rotary displacement between two shafts which rotate together. By connecting the shafts together by means of a torsion bar, the sensor may be used to measure transmitted torque. The sensor comprises first and second coaxial discs mounted on the shafts and having slots formed therein. A light source directs light through the slots onto an array of photodetectors and a data processor determines the displacement or torque from the positions on the array of images of the slot edges.

30 Claims, 13 Drawing Sheets

FIG 11
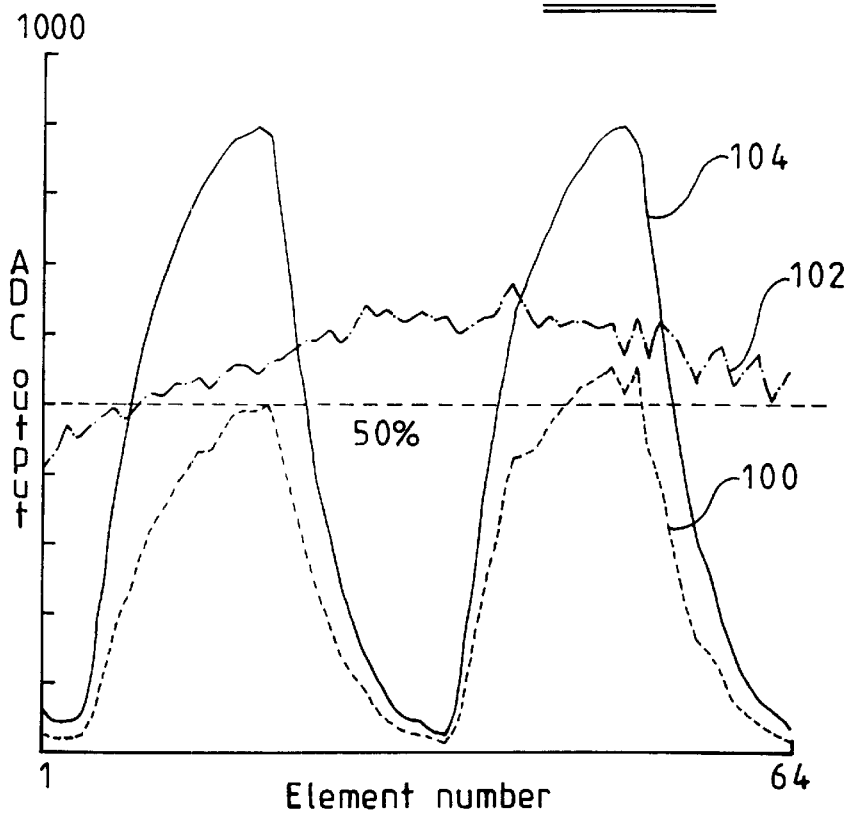
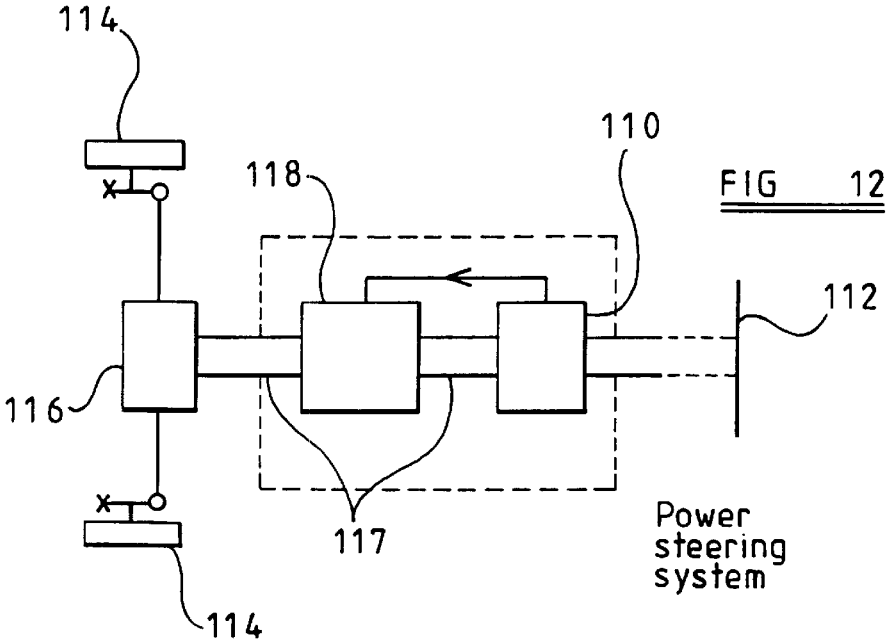
FIG 12

FIG 13
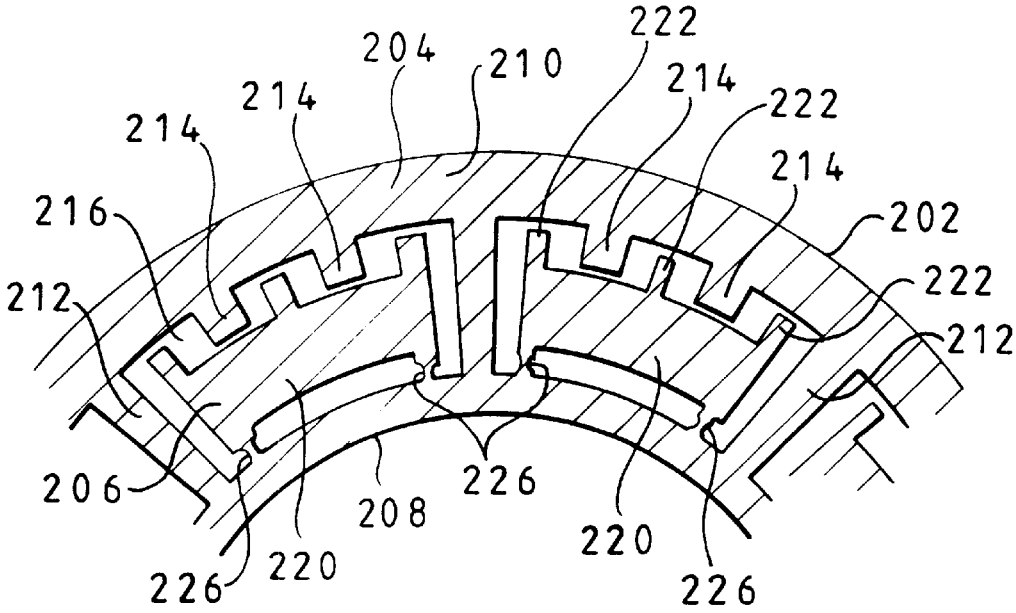
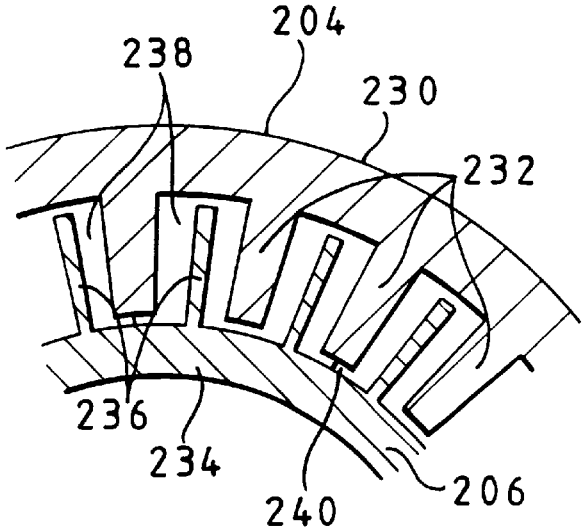
FIG 14

FIG 17
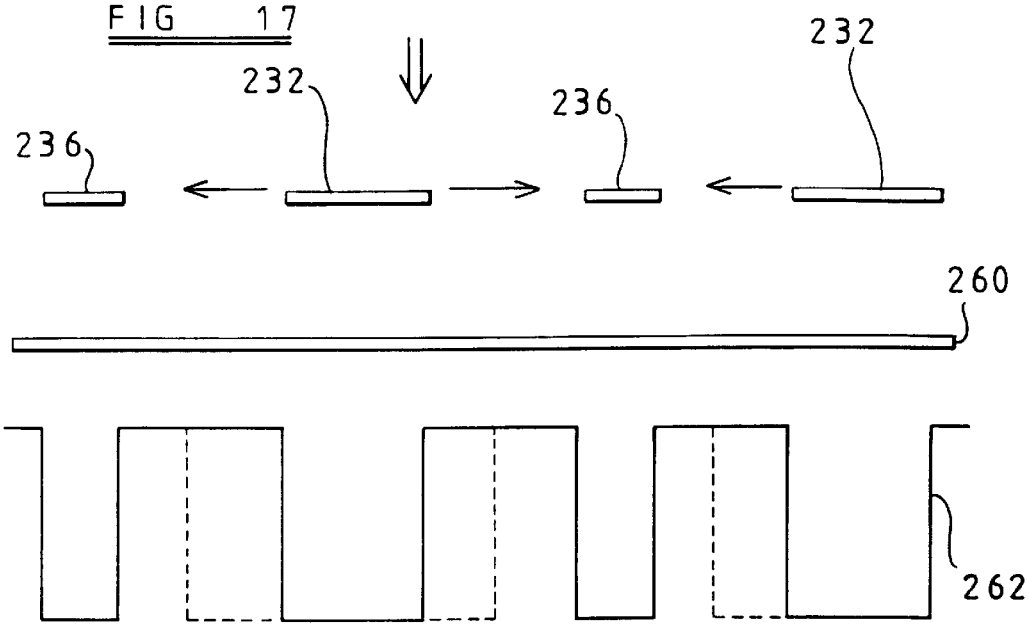
FIG 18
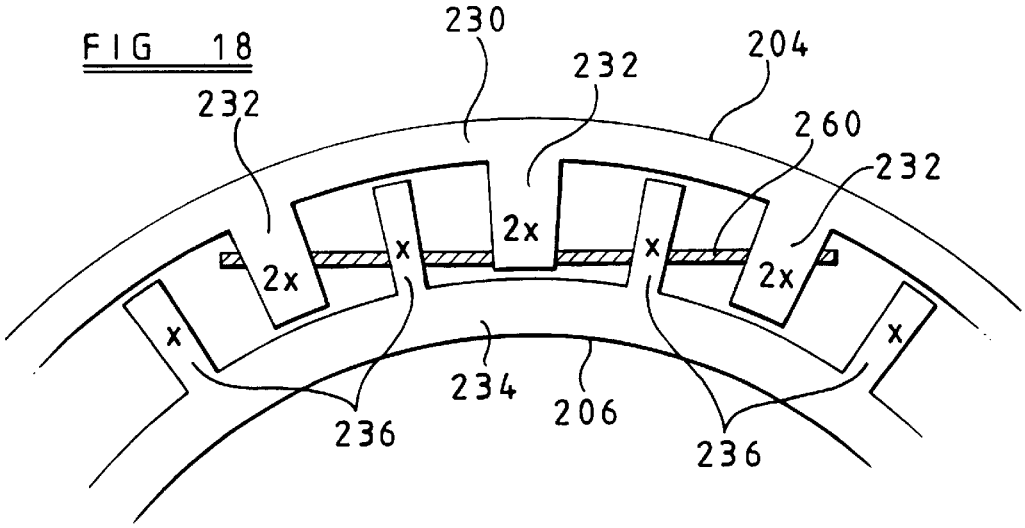
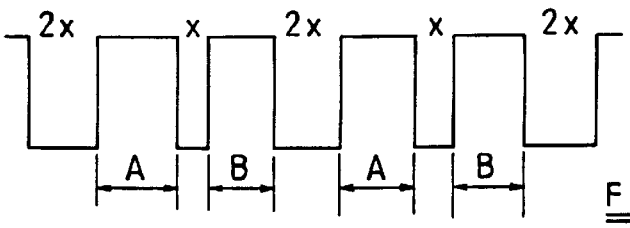
FIG 19

FIG 20
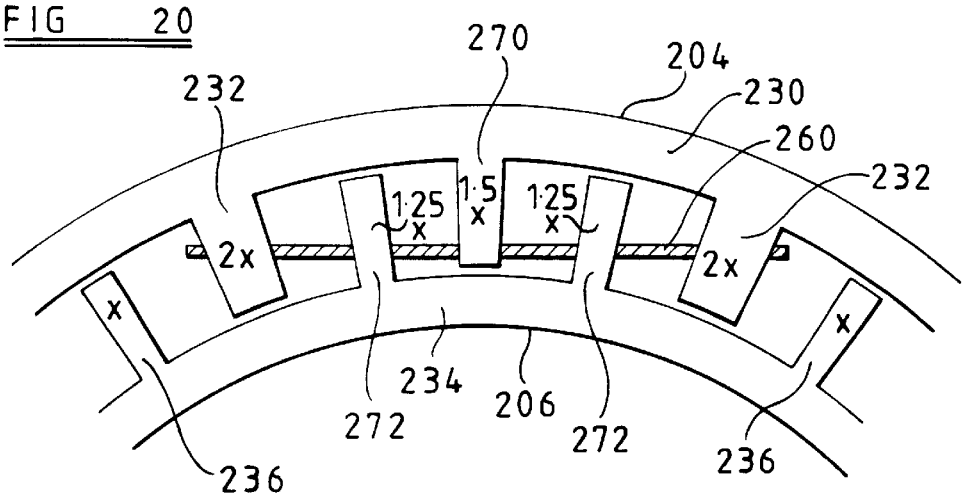
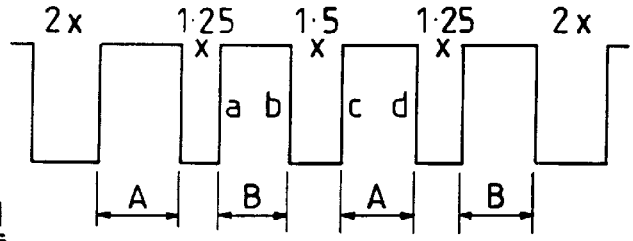
FIG 21
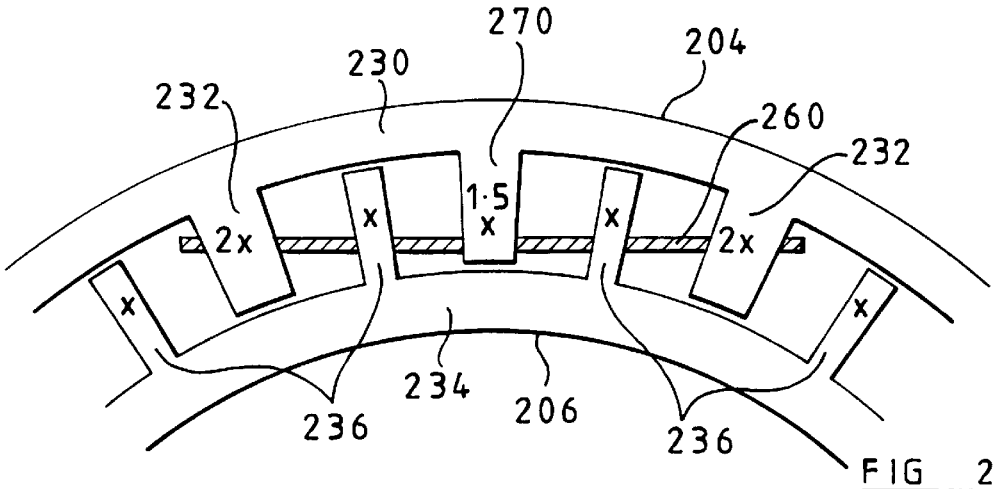
FIG 22
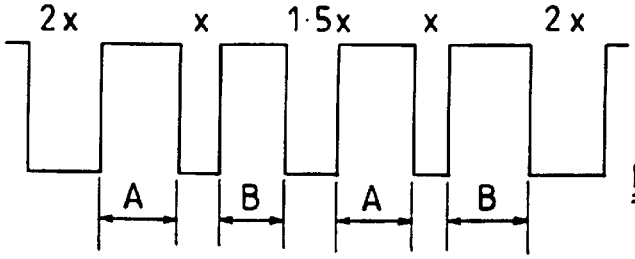
FIG 23

OPTICAL DISPLACEMENT SENSOR AND TORQUE SENSOR EMPLOYING RELATIVELY MOVABLE SLIT PATTERNS

Matter enclosed in heavy brackets [ ] appears in the original patent but forms no part of this reissue specification; matter printed in italics indicates the additions made by reissue.

The present invention relates to a position sensor and to a torque sensor including such a position sensor. The torque sensor is suitable for use within a vehicle steering control system such as an electrical power assisted steering (EPAS) system.

SU 517 815 discloses a torque measuring apparatus in which two discs are mounted on a torque transmitting shaft. The discs are spaced apart and each carries two sets of slots. The slots cooperate to define apertures for the passage of light. Light sources and photodetectors are positioned on opposing sides of the discs. The slots are overlapping and arranged such that relative motion between the discs due to a torque in the shaft alters the sizes of the apertures such that apertures associated with one cooperating set of slots increase in size, whereas the other apertures associated with the other cooperating set of slots decrease in size. The intensity of the light transmitted through the apertures is measured by the photodetectors and compared using a bridge circuit.

Such an intensity based arrangement needs shielding from stray light, and also requires matched sources and receivers or careful calibration in order to provide reliable measurements. Furthermore the discs must be manufactured to a high tolerance and be accurately mounted. Otherwise systematic variations in transmitted light intensity will occur due to errors in the width of the slot or run out (i.e. non coaxial alignment) between the discs. EP-A-0 194 930 describes a similar arrangement to that disclosed in SU 517 815.

SU-A-1 364 918 discloses a similar arrangement. However the outputs of the detectors are used to control digital timers. The times recorded on the timers are analyzed to determine the rate of rotation of the shaft and the torque transmitted by the shaft.

According to a first aspect of the invention, thee is provided an optical displacement sensor as defined in the independent claims.

Preferred embodiments of the invention are defined in the claims.

According to a second aspect of the present invention, there is provided a position sensor comprising a multi-element detector responsive to radiation impinging thereon, and a modulator movable with respect to the multi-element detector in response to movement of an input element whose position is to be measured, the modulator being arranged to modulate the radiation pattern incident on the detector.

Preferably a data processor, for example, dedicated hardware or a programmable data processor, is arranged to receive an output of the detector and to determine the position of the modulator by analyzing the output of the detector to locate the position of a transition of the intensity of the radiation incident on the detector between first and second intensities, or the positions of regions of a first intensity and regions of a second intensity.

Advantageously the magnitudes of the first and second intensities are dynamically adjustable. The first intensity may be defined as a range of intensities greater than a first intensity threshold. The second intensity may be a range of intensities less than a second intensity threshold. The second intensity threshold may be a predetermined fraction of the first intensity threshold. Alternatively, the data processor may normalize the output of each element of the detector and the first and second intensities may be judged by comparing the normalized output with a predetermined threshold value.

Preferably the input element is biased towards a first position with respect to a further element. The further element may be an output element of a force transmitting device. The position sensor may be arranged to measure the relative translational or rotational positions of the input and further element. It is thus possible to provide a load or torque sensor.

According to a third aspect of the present invention, there is provided a torque sensor, comprising a first modulating element mounted for rotation and arranged to spatially modulate radiation passing therethrough in accordance with a first modulating pattern, a second modulating element mounted for rotation and arranged to spatially modulate radiation passing therethrough in accordance with a second modulating pattern, the first and second modulating elements being coupled by a torsion member, and being optically in series, and a detector array responsive to a radiation pattern of radiation modulated by the first and second modulating elements.

Preferably the first and second modulating patterns are regular. Preferably the first modulating pattern has a predetermined mark-space ratio. Preferably the second modulating pattern has a predetermined mark-space ratio. Advantageously a period of the first modulating pattern is substantially equal to a period of the second modulating pattern. Advantageously the mark-space ratio of the first modulating pattern is different to that of the second modulating pattern. The periods and mark-space ratios may be measured in terms of distance or in terms of angle measured from an axis of rotation.

Preferably, when the torsion member is substantially rotationally unstressed, the first and second modulating patterns are offset with respect to one another by a predetermined amount. Preferably, when the torsion member is unstressed, the center of a mark in one pattern is substantially coincident with the centre of a space in the other pattern.

Preferably the first and second modulators are mounted on first and second shafts coupled together via the torsion element. The first and second modulators may be discs or cylinders coaxially disposed with respect to the torsion element. Advantageously the first and second modulators have a plurality of slits formed therein defining the marks or spaces of the modulation patterns. Advantageously the slits within each disc are substantially identical. Advantageously the width of first regions defining each end of, and separating neighbouring, slits of the first disc are twice the size of comparable regions of the second disc.

Preferably the spatial extent of the detector array is such that, in use, at least five transitions of the radiation between first and second thresholds will always be detectable by the array.

Preferably the detector array is arranged to be responsive to radiation passing through an area whose extent in a direction (be it linear or curved) parallel to the direction defining the spatial period of the first and second modulating patterns is such that the area is greater than a period of either pattern. Advantageously the detector array, the first modulator and the second modulator are relatively closed spaced and the detector array is longer than the period of the modulating patterns.

Advantageously a signal from each element of the detector array is provided to a data processor. The outputs of the detectors of the array may be output in a serial manner. The data processor may normalize the output of each element of the array to correct for different sensitivities between elements of the array. The data processor may examine the output of the array to determine the radiation pattern incident on the array from positions of transitions of radiation intensity between first and second intensity levels. The data processor may interpolate the intensity data to further refine the estimate of the positions of the transitions.

According to a fourth aspect of the present invention, there is provided a modulator arrangement for an optical position sensor for measuring the relative positions of first and second objects, the arrangement comprising first and second parts coupled together by severable links so as to hold the first and second parts in a predetermined relationship prior to attachment of the first part to the first object and the second part to the second object.

It is thus possible to provide an arrangement in which the relative positions of the first and second parts are accurately maintained during the construction of the optical position sensor. Such an arrangement avoids the intricate and time consuming alignment steps required to produce a reliable position sensor of the type described in SU 517 815.

Preferably the first and second parts define and move over a common surface. Advantageously, when each of the first and second parts in planar, the first and second parts are coplanar. Such an arrangement may reduce the effects of parallax within optical position sensors.

Preferably the severable links are waisted (i.e. narrower) regions of material connecting the first and second parts. The severable links can be broken following the attachment of the first part to the first object and the second part to the second object. The severable links may be broken by the application of stress, by etching, by mechanical cutting, by spark erosion, by laser cutting or by any other suitable process.

Preferably the first and second parts carry respective markers. In an arrangement for measuring limited relative rotary motion, such as in a torque sensor, the first part may comprise a first ring having a plurality of radially extending lands or fingers formed thereon. The lands or fingers may be inwardly extending. The second part may comprise a second ring having a plurality of lands or fingers extending therefrom, with the lands or fingers of the second part being interdigitated with the lands or fingers of the first part. One or both of the first and second rings may be divided into segments. In one embodiment, the second ring is divided into a plurality of segments. Each of the segments is held to the first part by respective severable links, and each segment is arranged to be individually attached to the second object.

According to a fifth aspect of the present invention, there is provided a modulator arrangement for an optical position sensor for measuring the relative positions of first and second object, the arrangement comprising first and second parts which define a common surface, the first part being attached to the first object and the second part being attached to the second object.

Advantageously the first and second parts are co-planar. Advantageously the first and second parts are concentric rings carrying respective markers thereon.

The present invention will further be described, by way of example, with reference to the accompanying drawings, in which:

FIG. 11 shows re-scaled output data collected from the detector shown in FIG. 1 when the light incident thereon forms a moving pattern;

FIG. 12 is a schematic diagram of an electrically operated power assisted steering system for an automobile incorporating a torque sensor constituting an embodiment of the present invention;

FIG. 13 is a plan view of part of a modulator arrangement constituting an embodiment of the present invention;

FIG. 14 is a plan view of part of a modulator arrangement constituting an embodiment of the present invention;

FIG. 17 is a schematic diagram showing the relationship between the discs of the detector array of the torque sensor and further showing an idealized output of the detector array;

FIG. 18 illustrates the relationship between a regular disc pattern and a detector array;

FIG. 19 illustrates a corrected output of the detector array of FIG. 18;

FIG. 20 illustrates the relationship between a first modified disc pattern and a detector array;

FIG. 21 illustrates a corrected output of the detector array of FIG. 20;

FIG. 22 illustrates the relationship between a second modified disc pattern and a detector array;

FIG. 23 illustrates a corrected output of the detector array of FIG. 22;

Like parts in the Figures are indicated by like reference numerals.

Figure 1:
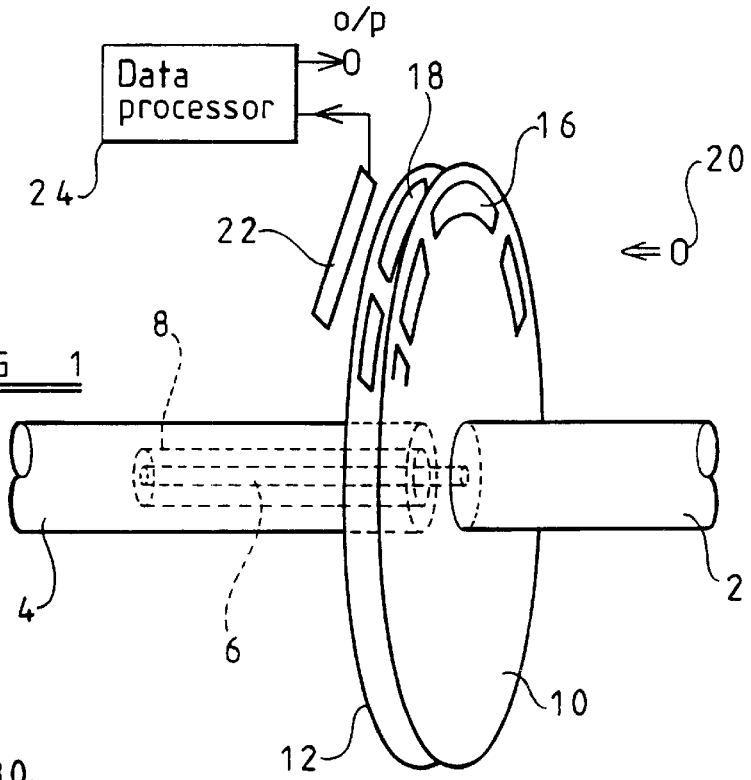
FIG. 1 is a schematic diagram of a torque sensor constituting an embodiment of the present invention.

As shown in FIG. 1, an input shaft 2 is coupled to an output shaft 4 via a torsion bar 6 coaxial with the input and output shafts 2 and 4. The torsion bar 6 extends within a recess 8 formed in the output shaft 4. The torsion bar would be shielded from view, but is indicated by a broken line so as to illustrate the internal structure of the arrangement. First and second discs 10 and 12 are carried by the input and output shafts, respectively. The discs are closely spaced and have a plurality of slots 16, 18 formed therein. The slots 16 of the first disc 10 are arranged to overlap with the slots 18 of the second disc 12. The discs 10 and 12 are interposed between a light source 20 (which may emit visible, infra-red or ultra violet light) and an array 22 of photodetectors. The slots 16 and 18 are arranged to modulate the light passing from the source 20 to the detector array 22. A data processor 24 is arranged to receive the output of the detector array 22 and to derive torque and position data therefrom.

Figure 2:
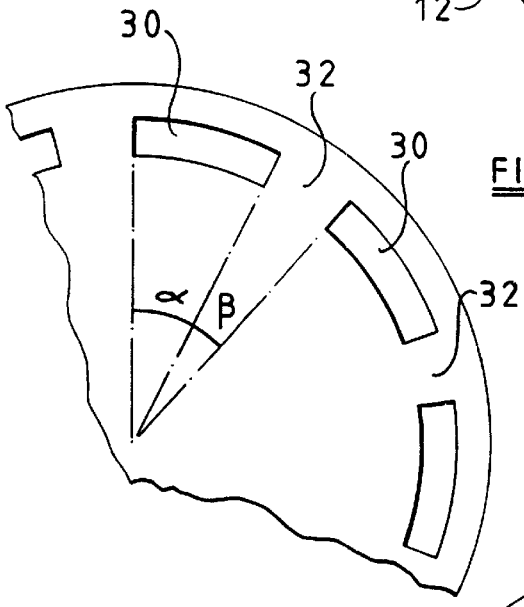
FIG. 2 is a part plan view of a first modulator disc.
Figure 3:
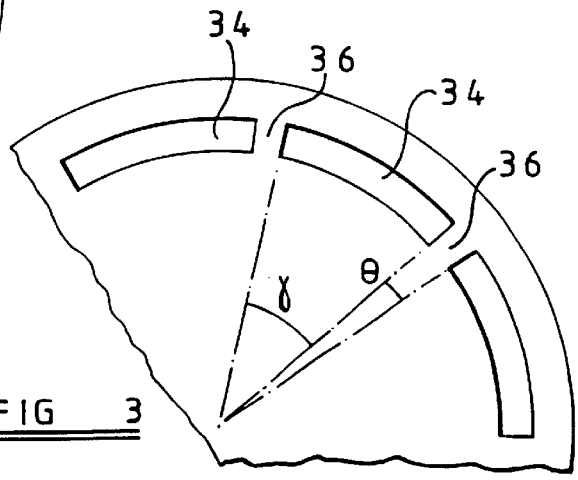
FIG. 3 is a pat plan view of a second modulating disc.

FIG. 2 shows part of a first design of disc. Regularly spaced slots 30 are formed in the disc. The slots are shown as being relatively thin and extending in an arc following the circumference of the disc. However other slot shapes may be used. When viewed from the axis of the disc, each slot subtends an angle $\alpha$ and each inter-slot region 32 subtends an angle $\beta$. FIG. 3 shows a second disc design in which each slot 34 subtends an angle $\gamma$ and each inter-slot region 36 subtends an angle $\theta$.

Figure 4:
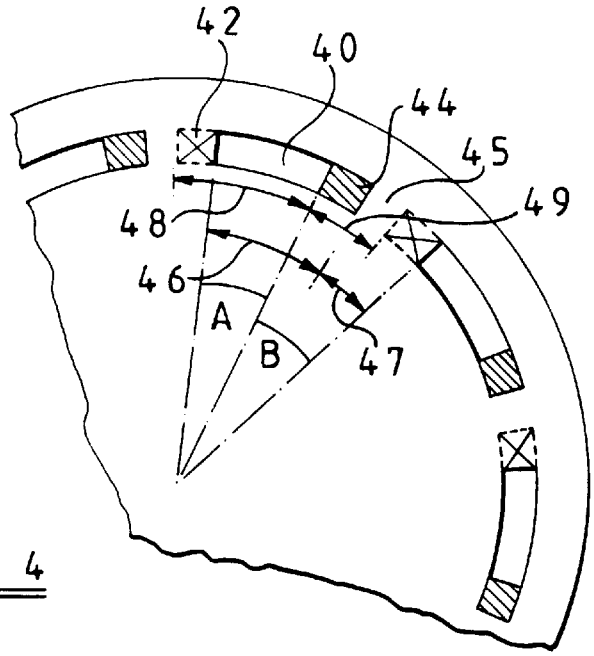
FIG. 4 is a plan view of a first arrangement comprising two discs of the type shown in FIG. 2.

The apparatus shown in FIG. 1 may be constructed with similar or dissimilar disc designs. FIG. 4 illustrates an arrangement using two discs of the same design, such as two discs of the first design, whereas FIG. 5 illustrates an apparatus using dissimilar disc types, such as discs of the first and second designs.

FIG. 4 shows a view of the discs 10 and 12 when both discs are of the first design and when no torque is transmitted by the torsion bar 6. The discs are rotationally offset with respect to one another. The region 40 indicates the area where the slots of each disc align. Region 42 indicates the area where the slot 18 in the second disc overlaps with the inter-slot region of the first disc. Region 44 indicates the area where the slot 16 of the first disc 10 overlaps with the inter-slot region of the second disc. Region 45 indicates where the inter-slot regions of both discs overlap. Line 46 indicates the angle subtended by the slot 16 of the first disc 10 whereas line 47 indicates the angle subtended by the inter-slot regions in the first disc 10. Line 48 indicates the angle subtended by the slot 18 of the second disc 12 and line 49 indicates the angle subtended by the inter-slot regions in the second disc. The discs in this arrangement have slot regions twice the angular length of the inter-slot regions. The light transmitting region of the arrangement subtends an angle A, where as the non-transmitting region of the arrangement subtends an angle B. The discs may be arranged such that A=B under zero torque conditions. Torque in a first direction makes A greater than B, whereas torque in an opposing direction makes A less than B. The relative sizes of A and B are indicative of the torque being transmitted from the input shaft 2 to the output shaft 4.

Figure 5:
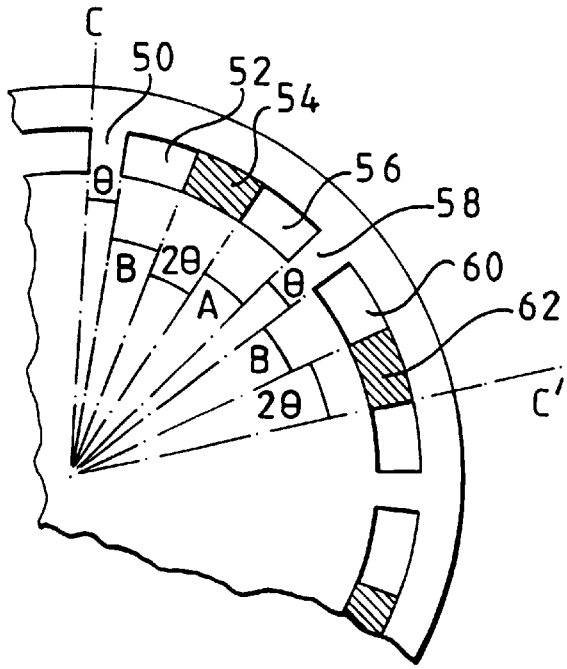
FIG. 5 is a plan view of a second arrangement comprising two discs, one as shown in FIG. 2 and the other as shown in FIG. 3.

FIG. 5 shows the situation where the second disc is of the FIG. 2 design and the first disc is of the FIG. 3 design. The sum $\alpha+\beta=\gamma+\theta$. Thus the discs have the same spatial period. Furthermore, in this embodiment, $\beta=2\theta$. The discs are off-set by half a spatial period, such that, under zero torque conditions, the non-transmitting regions of the second disc are substantially centered with respect to the slots of the first disc. Thus, when moving along the curved path between C and C' in FIG. 5, there is a non-transmitting region 50 subtending an angle $\theta$, a transmitting region 52 subtending an angle B, a non-transmitting region 54 subtending an angle $2\theta$, a transmitting region 56 subtending an angle A, a non-transmitting region 58 subtending an angle $\theta$, a transmitting region 60 subtending an angle B, and a non-transmitting region 62 subtending an angle $2\theta$. The angles A and B, that is the sizes of the transmitting regions, are a function of torque, whereas the angles $\theta$ and $2\theta$ are constants.

Figure 6:
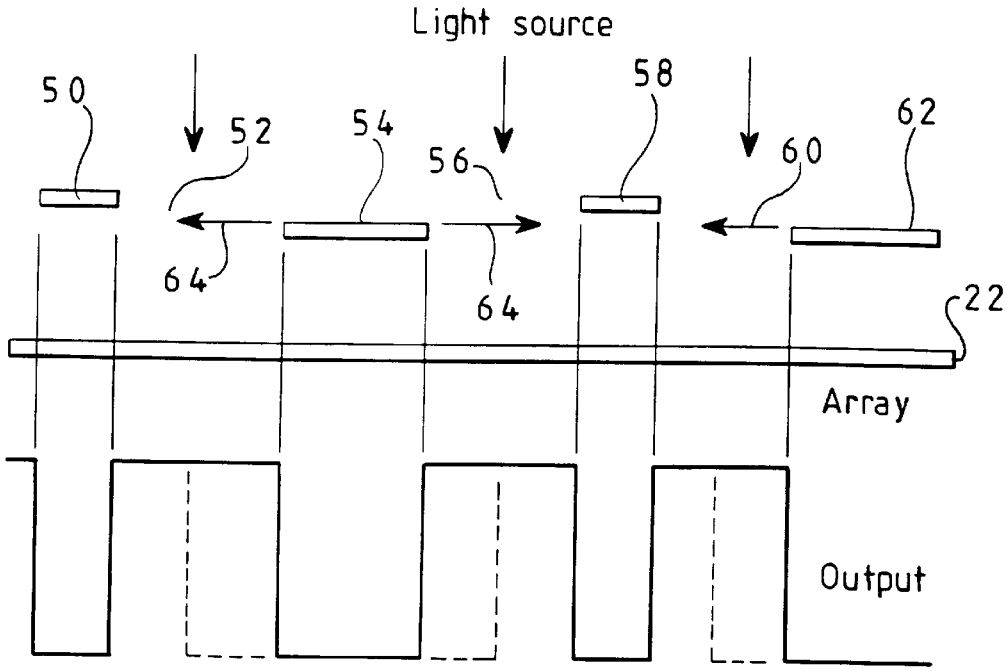
FIG. 6 is a schematic diagram showing the relationship between the discs and the detector array of FIG. 1 and further showing an idealized output of the detector array.

FIG. 6 illustrates the arrangement shown in FIG. 5 in schematic cross section and also shows the variation of output of the elements of the array with changing position within the array.

When the torsion element 6 is unstressed, the sizes of the transmitting regions 52 and 56 are substantially equal. If a torque is applied in a first direction, the region 52 decreases in size, whereas the region 56 increases in size. A torque acting in the opposite direction increases region 52 and diminishes region 56. The array measures the relative positions of the discs 10 and 12 by measuring the sizes of the light transmitting and non-transmitting regions 50 to 62. As the shafts rotate, the entire pattern will shift across the array. However, as the discs 10 and 12 carry a plurality of slots, a repeating pattern of transmitting and non-transmitting regions always modulates the light incident on the array 22. The relative movement between the discs is constrained such that the region 54 cannot overlap with regions 50 or 58. The permissible range of relative movement is indicated by the arrows 64.

The length of the array is such that it sees the light modulated in a region greater than one spatial period of the slots, and sees at least five transitions in light intensity between relatively dark and relatively bright.

Figure 7:
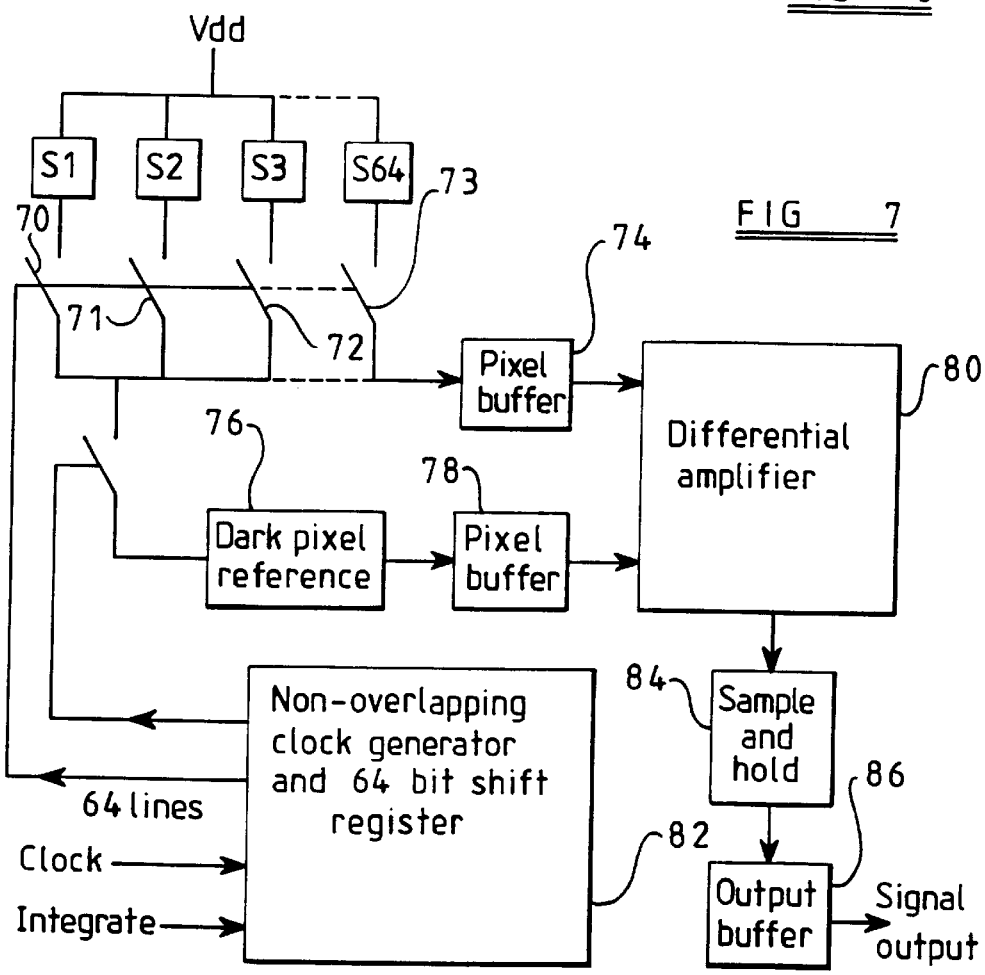
FIG. 7 is a schematic diagram of the detector array and associated output circuit.

A suitable array is provided by the Texas TSL213 or TSL401 device which incorporates 64 light sensitive elements and circuitry to read their outputs in a sequential manner. Other similar devices having more light sensitive elements are planned. The light sensitive elements S1 to S64 (FIG. 7) supply outputs to a first pixel buffer 74 via sequentially operated switches 70 to 73 (there is one switch for each pixel). A dark reference 76 simultaneously supplies a reference signal to a second pixel buffer 78. The contents of the pixel buffers are sequentially read out and supplied to inverting and non-inverting inputs of a differential amplifier 80 which forms a difference between the signals. The output of the amplifier 80 is supplied to a sample and hold 84 before being output via a buffer 86. All the functions of the device are controlled via a clock generator and shift register element 82.

Figure 8:
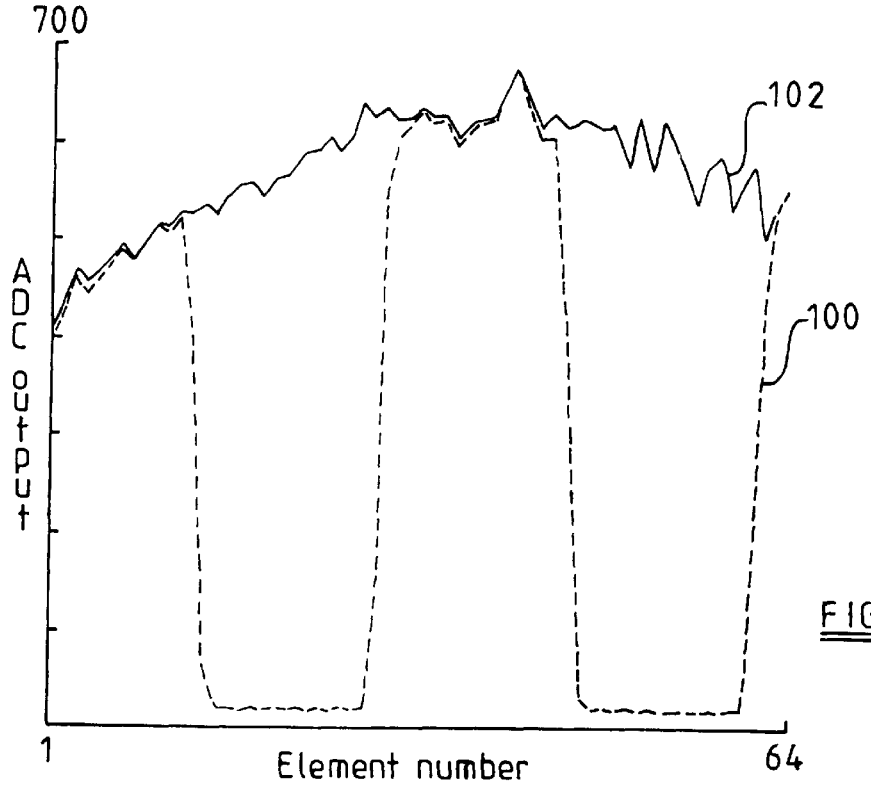
FIG. 8 shows output data collected from the detector shown in FIG. 1 when the light incident thereon forms a stationary pattern.

FIG. 8 shows an example of the output of the array 22 when the light incident thereon is modulated by a single stationary disc. The element number of each element of the array is shown along the abscissa and the corresponding output of each element is shown along the ordinate. The chain line 100 shows the output following modulation of the light by the disc. The solid line 102 represents the base response of a uniformly illuminated array as a comparison. Each datum has been joined to its neighbors by a straight line so as to improve the clarity of the Figure.

The array is clear non-uniform in its response. The data processor 24 is arranged, during operation of the torque sensor, to keep a running record of the maximum and minimum outputs recorded from each element (i.e. its fully illuminated and dark values, respectively) and to use this to normalize the output of the array. If a signal value for a given element exceeds the current value stored as the maximum for that element, then the value of the maximum is updated to or incremented towards the new signal value. If the signal value is less that the current value stored as the maximum, then the value of the maximum is decremented. A similar scheme is used to set the minimum value of each element of the array, but with the minimum value being reset to or decremented towards a lower level when the signal form the sensor is lower than the currently stored minimum value, and with the minimum value being incremented when the signal value is greater than the currently stored minimum value. Thus the maximum and minimum values tend to drift towards each other until being reset by a signal exceeding or less than the appropriate value. The maximum and minimum values are then used to rescale the signal.

Figure 9:
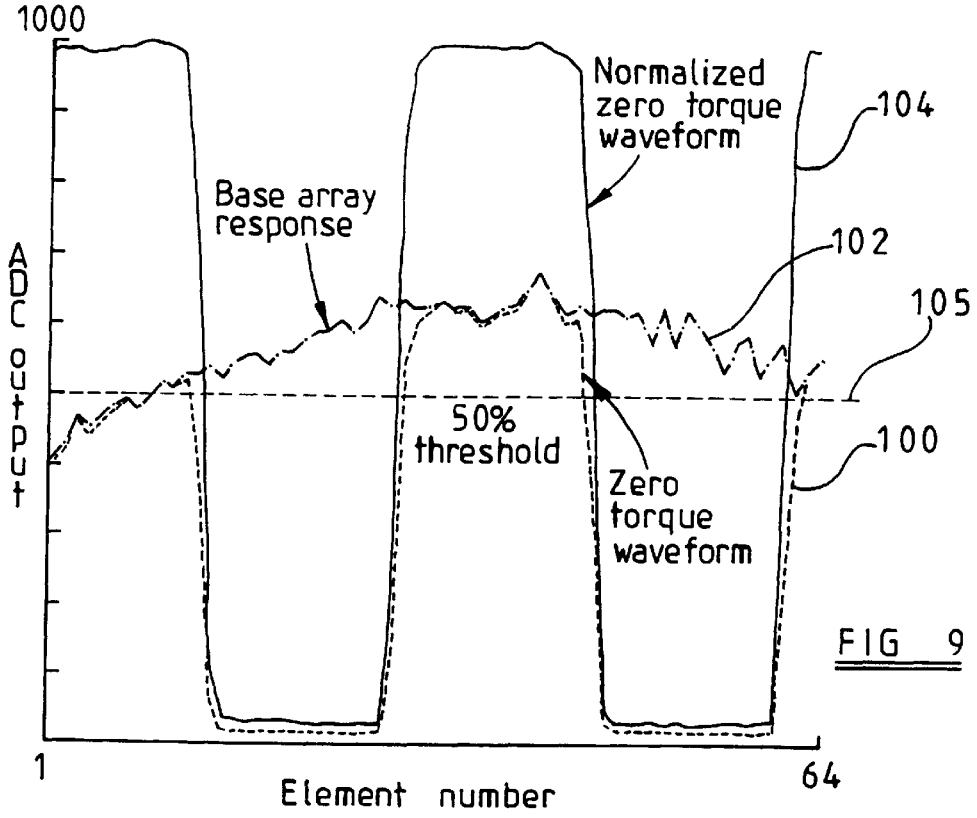
FIG. 9 shows the output data of FIG. 8 following re-scaling.

FIG. 9 shows the result of normalizing the output signals shown in FIG. 8. The solid line 104 indicates the normalised values. The base response 102 and un-normalized values 100 are shown as a comparison.

The data processor then checks the normalized data for transitions between high values and low values by comparing the data with a threshold 105. The number of high-to-low transitions and the number of low-to-high transitions are recorded. For the embodiment shown in FIG. 5, an error is indicated if the total number of transitions is less than five.

When using two discs, for example as shown in FIG. 5, there are four cases that need to be considered. The data processor must decide whether it is going to use positive going or negative going edges as indicators of the disc positions. The data processor must further decide whether the first edge it detects belongs to the first disc 10 (having a non-transmitting region subtending angle θ) or the second disc 12 (having a non-transmitting region subtending an angle 2θ). If the first transition detected is a positive going edge, then the subsequent measurements are made using positive edges, similarly if the first transition is a negative going edge then the subsequent measurements are made using negative going edges.

FIGS. 10a–10d schematically illustrate the four cases that can occur for the same amount of torque. In each instance the first positive going transition is labelled POS(0), the second positive transition is POS(1) and so on. Negative going transitions are labelled NEG(0), NEG(1) etc in the same manner. In the FIGS. 10a to 10d, the region indicated as 2X corresponds to the interslot regions 54 and 62 shown in FIG. 6. The regions indicated as X correspond to the interslot regions 50 and 58 shown in FIG. 6.

The data processor calculates a period P of the light pattern incident on the detector array 22. When the first transition is from relative dark to relatively bright, the period is calculated as POS(2)–POS(0), as indicated in FIGS. 10a and 10c. The period P is calculated as NEG(2)–NEG(0) when the first transition is from relatively bright to relatively dark, as shown in FIGS. 10b and 10d.

The data processor also calculates the length of a mark M. If the first transition is from relatively dark to relatively bright and POS(1)–NEG(0) is greater than POSA(2)–NEG (1) then M is calculated as POS(2)–POS(1). If the first transition is from relatively dark to relatively bright and POS(1)–NEG (0) is less than POS(2)–NEG(1) then M is calculated as POS(1)–POS(0), as shown in FIG. 10c.

The other two cases occur when the first transition is from relatively bright to relatively dark. If POS(0)–NEG(0) is greater than POS(1)–NEG(1) then M is calculated as NEG(1)–NEG(0), as shown in FIG. 10b. If POS(0)–NEG(0) is less than POS(1)–NEG(1) then M is calculated as NEG (2)–NEG(1), as shown in FIG. 10d. The cases shown in FIGS. 10a and 10c have a mark M which includes a dark period of length X, whereas the cases shown in FIGS. 10b and 10d have a mark M which includes a dark period of length 2X.

The torque can be calculated by comparing the mark M and the period P. The precise details of the calculation are dependent upon the geometry of the discs 10 and 12. An example of the calculation will be given for the embodiment shown, in FIG. 5. The relative sizes of the slots and interslot regions are arranged such that $\alpha=5.5\theta$, $\beta=2\theta$ and $\gamma=6.5\theta$. The discs 10 and 12 are arranged such that, under zero torque conditions, the angles A and B are equal to one another and have a magnitude of $2.25\theta$. Furthermore, the relative motion between the discs is constrained such that the minimum values of A and B are equal to θ. For such an embodiment, the percentage of maximum torque transmitted through the torsion bar 6 for the cases illustrated in FIGS. 10a and 10c can be calculated from:

$$\text{torque}(\%)=600M/(P-260) \quad (1)$$

The percentage torque transmitted in the cases illustrated in FIGS. 10b and 10d can be calculated from:

$$\text{torque}(\%)=600M/(P-340) \quad (2)$$

The percentage torque can be converted directly into force if the torsional rigidity of the torsion bar 6 is known.

Figure 10:
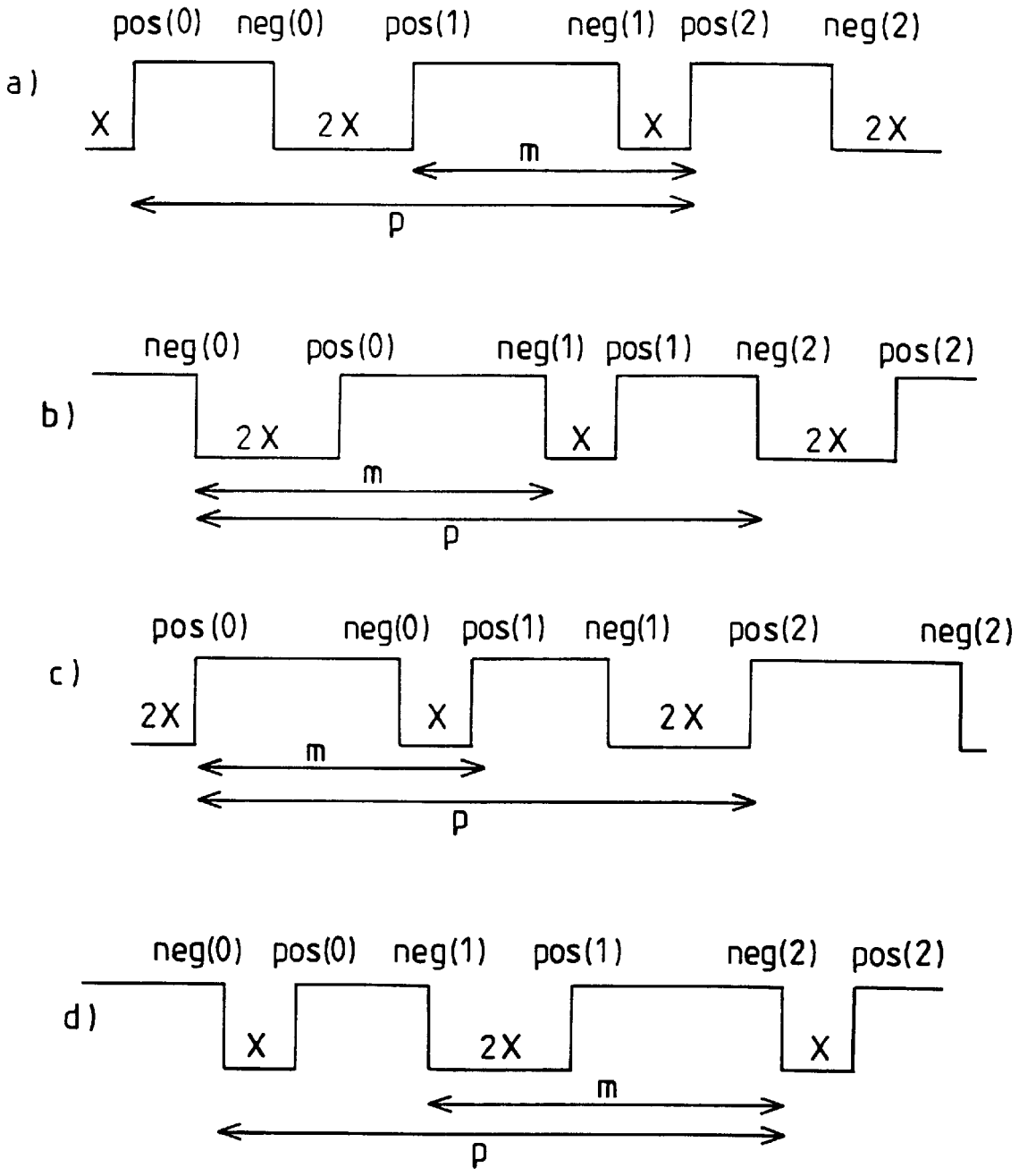
FIGS. 10a–10d shows the waveforms from the output of the sensor array for four different regions and further show two measurements for each region that are derived during processing of the sensor array output.

The detector array 22 is operated so as to take a "soap shot" of the light impinging thereon at a given moment in time. The data processor 24 samples the data from the detector array 22 at predetermined intervals. The interval between samples is chosen such that rates of rotation up to a design maximum can be accurately measured. Ideally the rise and fall time of the photodetectors of the detection array 22 will be sufficiently rapid to have little or no effect on the values read from the photodetectors. However, if the discs 10 and 12 move sufficiently rapidly, the output from the detector array 22 may be modified by the rise and fall times of the detectors therein. The effect of rise and fall times is shown in FIG. 11. The lines 104 and 100 are equivalent to those shown in FIG. 9. The roughly square wave shape of line 104 in FIG. 9 becomes distorted due to the rise and fall times. The detection scheme always uses transitions of the same polarity when making measurements, that is all the transitions used for calculating M and P are either rising transitions as shown in FIGS. 10a and 10c or all the transitions are falling transitions as shown in FIGS. 10b and 10d. Thus the apparatus is not affected by asymmetry in the rise and fall times of the elements of the detector array 22. The positions of the transitions can be judged as the position at which the output of the array with respect to position along the array crosses a 50% threshold. The thresholded measurements can then be used in the calculations as explained hereinabove with reference to FIGS. 5 and 10.

The detector elements of the array 22 are spatially finite. However, the position at which the transitions occur can be estimated to a greater resolution than the inter-element distance of the detector array by interpolating the output of the array. The interpolation may be a simple straight line interpolation between the central position of each element of the detector array.

Ideally the elements of the detector array are contiguous. However, the invention can still be implemented if there are gaps between adjacent elements of the detector array. Such gaps give rise to a "dead zone". If the position of a transition falls within the dead zone it becomes difficult to estimate the actual position of the transition. This problem can be overcome by using a non-point source of light to illuminate the discs 10 and 12. A non-point source of illumination causes the transitions in the intensity of light at the detector array to become blurred. If a transition occurs over a gap between adjacent elements of the detector array, the blurred transition extends over the adjacent elements. The light intensity received by each of the adjacent elements is a function of the position of the transition and the outputs of the elements may be interpolated so as to estimate the position of the transition.

A diffuser may be placed between the light source 20 and the disc 10 so as to create a non-point source of illumination.

The use of a non-point source of illumination can also be of benefit in overcoming problems of limited dynamic range of the detector array 22. Blurring of a transition such that it extends over three adjacent detector elements enables at least one of the detector elements to operate within a non-saturated region of the element response characteristic. Thus the outputs of the elements can be interpolated so as to accurately determine the position of the transition.

The data processor can further be arranged to estimate the amount of rotation from a given reference position and the speed at which rotation is occurring.

The embodiment shown in FIG. 1 is suitable for inclusion within a power steering system of a vehicle and, for example, may replace the torque sensor arrangement described in EP-A-0 555 987. Two sets of light sources and sensor arrays may be used in a diametrically opposed fashion within the torque sensor. Such an arrangement allows the effects of the disc run out to be corrected for and also provides a degree of redundancy which may be important in safety critical systems.

The power steering system shown in FIG. 12 comprises an optical torque sensor 110 constituting an embodiment of the present invention for measuring the torque transmitted from a vehicle steering wheel 112 to the vehicle wheels 114 via a rack and pinion system 116. An electric motor 118 is mounted on a shaft 117 between the torque sensor 110 and the rack and pinion 116, and is arranged to augment the torque supplied to the rack and pinion 116 in response to the signal supplied from the torque sensor 110.

It is thus possible to provide an electrically assisted power steering system incorporating a robust and reliable torque sensing element.

The optical modulator shown in FIG. 13 comprises a disc 202 of material which has been processed so as to define first and second cooperating optical modulators 204 and 206, respectively, therein. The first optical modulator 204 consists of an inner ring 208, an outer ring 210 and a plurality of regularly spaced radially extending supports 212 connecting the inner and outer rings 208 and 210. The outer ring 210 is profiled so as to define two inwardly extending lands 214 within each gap 216 formed between each neighboring pair of the radially extending supports 212. The lands 214 are regularly spaced within each gap 216 and have the same width as the radially extending supports 212. The lands 214 and the supports 212 define a regular pattern of projections extending inwardly from the outside disc 210.

The second modulating element 206 comprises a plurality of part annular segments 220. One segment 220 is provided within each one of the gaps 216 defined between each pair of neighboring radially extending supports 212. Each segment 220 has three radially outward extending lands 222 formed thereon. The lands 222 are interdigitated with the lands 214 and portions of the radially extending supports 212 proximate the outer ring 210. The lands 222 bisect the spaces defined between neighboring lands 214 and between a land 214 and the neighboring radially extending support 212.

Each segment 220 is secured to the inner ring 208 via severable links 226. The severable links 226 are wasted portions of material radially extending from each segment 220 to the inner ring 208. The wasted portions serve only to hold the segments 220 in a predetermined relationship with the first optical modulator 204 until each of the segments 220 is secured to an end 251 of a first shaft 250 and the inner ring 208 is secured to a second shaft 252, as shown in FIG. 15.

The embodiment shown in FIG. 14 has a first optical modulator 204 comprising an output ring 230 having inwardly extending regularly spaced lands 232 extending therefrom. Each land 232 has the same width as every other land 232. A second optical modulator 206 comprises an inner ring 234 having regularly spaced radially outwardly extending lands 236 formed thereon. The lands 236 are interdigitated with the lands 232 and each land 236 bisects each gap 238 defined between neighboring lands 232. The lands 236 are narrower than the lands 232.

Figure 16:
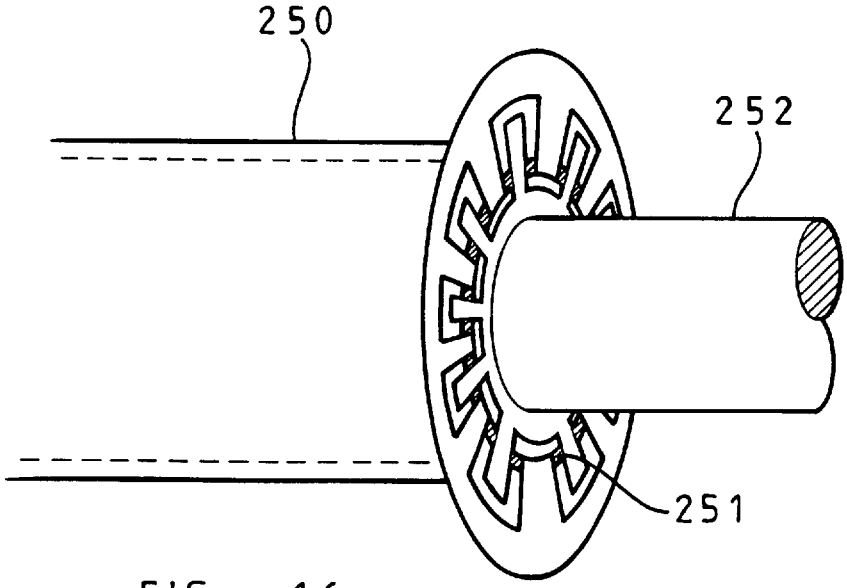
FIG. 16 is a schematic perspective view of a torque measuring apparatus, suitable for use in automotive electric power steering systems, employing a modulator constituting an embodiment of the present invention.

Severable links 240 extend between some of the lands 232 and the inner ring 234 so as to hold the outer ring 230 and the inner ring 234 in a predetermined relationship until the first optical modulator is attached to an end 251 of a first shaft 250 and the second optical modulator is attached to a second shaft 252, as shown in FIG. 16.

Figure 15:
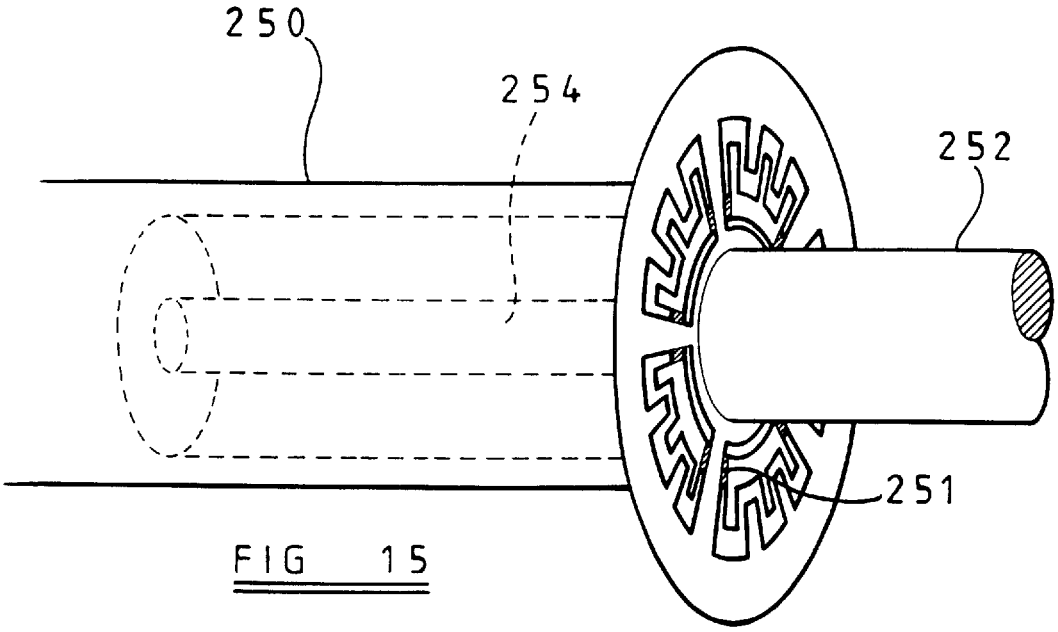
FIG. 15 is a schematic perspective view of a torque measuring arrangement, suitable for use in an automotive electric power steering system, employing a modulator arrangement as shown in FIG. 13.

In each of the arrangements shown in FIGS. 15 and 16, the first and second shafts 250 and 252 are connected together by a torsion bar 254 which extends within a recess in the first shaft 250 and is attached thereto, as indicated by the chain lines in FIG. 15. The torsion bar 254 allows only limited relative movement between the first and second shafts 250 and 252 such that the lands 214 and 232 of the first optical modulators never come into contact with the lands 222 and 236 of the second optical modulators. In the arrangement shown in FIG. 15, the radially innermost portions of the segments 220 are welded to the first shaft 250 whereas, in the arrangement shown in FIG. 16, the radially inwardmost portions of the lands 232 are welded to the fist shaft 250. In each case, part of the interdigitated arrangement of lands extends radially outwardly from the first shaft 250 such that the optical modulators can be interposed between a light source and a detector element or detector array (not shown).

The optical modulators may, for instance, be formed by masking and subsequent chemical etching of a metallic disc, by direct cutting of a disc, by spark cutting, by electro forming, by laser cutting, by electro forming, or by fine blanking. The severable links may be broken by spark erosion, by laser cutting, or by mechanical force. Furthermore, the material chosen to form the optical modulators may be chosen with regard to the specific application of the modulator element and may be formed of a plastics or other suitable material.

In use, the optical modulators may be co-planar. This gives an improvement in the modulation pattern since parallax is avoided or reduced. Some of the advantages of the embodiments shown in FIGS. 13 and 14 may be achieved by making the optical modulators separately but mounting them, in use, in a common plane.

The optical modulators illustrated in FIGS. 13 to 16 are particularly suited for use in torque sensors of the type illustrated in FIGS. 1 to 12. One optical modulator is attached to an input shaft, the other optical modulator is connected to an output shaft and the input shaft is connected to the output shaft via a torsion bar in a manner similar to that shown in FIG. 15. The input and output shafts are free to rotate but the motion of one shaft with respect to the other is limited to a small angular deviation. The optical modulators are illuminated by a light source and the optical pattern formed by the modulators is analyzed by a multi-element optical array. The pattern of illumination is analyzed to determine the separation between pairs of like transitions (i.e. from bright to dark or from dark to bright) and these data are then used to calculate the angular displacement between the first and second shafts.

FIG. 17 schematically illustrates the positions of the lands 232 and 236 in the arrangement shown in FIG. 16, together with the position of the detector array 260 and an idealised output of the detector array 262. The chain lines represent the maximum extent by which the lands 232 can move with respect to the lands 236 as a result of torque transmitted from the input shaft to the output shaft.

As the input and output shafts rotate, the pattern of optical modulation, and consequently the output signal, move with respect to the sensor array 260. However, this is of no consequence as the processing technique described hereinbefore examines the relative positions of transitions between light and dark on the sensor array and will always estimate the torque acting on the shafts provided that five transitions between light and dark fall on the sensor array 260. The relative sizes of the optical modulators and the sensor array are chosen such that this condition is always satisfied.

It is necessary that the relative positions of the first and second optical modulators are well defined when the input and output shafts 250 and 252 are not subjected to any torque. By attaching discs, as exemplified in FIGS. 13 and 14, to the shafts 250 and 252 during a no torque condition, accurate alignment of the first and second optical modulators is ensured. This avoids the relatively time consuming checking and alignment that would be required using separate discs of the types described in the prior art, and results in both an improvement in alignment and subsequent performance of the torque sensor and a reduction in manufacturing time. The arrangement may also be modified for use with linear displacement sensors. Furthermore, the provision of co-planar discs reduces parallax errors within the torque sensor and thereby improves its accuracy.

It is thus possible to provide an accurately aligned and relatively inexpensive optical modulator for use in optical displacement detectors.

FIG. 18 shows an embodiment of the type shown in FIG. 14 after the severable links have been severed. The optical modulators 204 and 206 are viewed from the side of the light source (not shown) ad the active area of the sensor array 260 is shown behind the lands 232 and 236. In this embodiment, each of the lands 232 has an angular width of 2× whereas each of the lands 236 has an angular width of x.

The output of the sensor array 260 is normalized and the curved path of the edges of the lands 232 and 236 is mapped onto the straight sensor array 260 so as to produce the compensated waveform shown in FIG. 19. The periods A and B vary in accordance with the relative angular displacement between the optical modulators 204 and 206. Where the optical modulators 204 and 206 are interconnected by a torsion bar, the relative displacement is proportional to torque. Thus, the torque is directly proportional to (A−B)/(A+B).

For certain applications of displacement and torque sensors, it is necessary or desirable for the rotary position of the optical modulators to be known. For instance, when a torque sensor of this type is used in an electrical power assisted steering system, it is essential to be able to detect when the steering wheel is at the "straight ahead" position.

One known technique for a steering system comprises calculating the average steering wheel position during the course of a trip. However, this average may take a significant amount of time to converge and depends on the route being driven. For instance, such centering may drift if a vehicle is driven around a circular track.

Another known technique determines when the steered wheels are in the straight ahead position by measuring the speeds of the steered wheels. However, such an arrangement requires two sets of road speed sensors together with the associated wiring and signal components and is therefore relatively expensive. Furthermore, the centering may drift, for instance as a result of wheel spin or wheel slip.

The sensor shown in FIG. 18 may be modified as shown in FIG. 20 in order to provide a detectable index position from which the absolute rotary positions of the optical modulators 204 and 206 can be determined. The optical modulator 204 is modified in that one land 270 is of reduced width, for instance 1.5× as shown in FIG. 20. Further, the optical modulator 206 is modified in that the two lands 272 on either side of the land 270 are of increased width, for instance 1.25×. This is achieved by moving the edges of lands 272 facing the land 270 towards the land 270 so that the angular gaps corresponding to the periods A and B remain unchanged throughout rotation of the torque sensor.

FIG. 21 shows the modified and corrected waveform from the sensor array 260 with the optical modulators as shown in FIG. 20. Again, the torque is directly proportional to (A−B) /(A+B).

The modified lands 270 and 272 can be detected in software by measuring the ratio of the measured width of each land to (A+B). This compensates for any variations in optical magnification caused by the spacing of the optical modulators 204 and 206 from the sensor array 260. It is thus possible to detect the index position of the torque sensor without requiring additional hardware and requiring only relatively little additional software for a software-based embodiment. FIG. 22 illustrates another modified embodiment which differs from that shown in FIG. 18 only in that the tooth 270 of width 1.5× replaces one of the lands 232. FIG. 23 illustrates the compensated output of the sensor array 260. All of the lands 236 of the optical modulator 206 have the same width x. Again, the torque is proportional to (A−B)/(A+B) and the index position is determined by comparing the angular extent of the lands 232 and 270 with (A+B). The lands 236 adjacent the land 270 are not modified but the lands 232 and 236 are all made slightly bigger so as to compensate for the reduced width land 270.

This arrangement simplifies recognition of the index position and reduces the area of the optical modulators which has a non-standard slot period. Such an arrangement is therefore particularly useful for some of the signal processing techniques described hereinafter.

Although the arrangements shown in FIGS. 20 and 22 are capable of recognizing an index position, in the case of applications such as steering systems, these arrangements cannot determine whether the steering wheel is at the straight ahead position or one (or more) complete revolution away from the straight ahead position. However, positions one or more complete revolutions away from the straight ahead position may be detected by checking the steering wheel torque above a certain road speed; the transmission of greater than a predetermined amount of torque indicates that the steering wheel is away from the straight ahead position.

As described hereinbefore, the torque sensor relies on light from a small aperture source passing through a circular ring of slots in two opaque rotary elements 204, 206 onto a linear array 260, for instance of 128 optical sensor elements. Shaft torque is arranged to give relative rotation of the two elements 204, 206. The resultant pattern projected through the two elements 206, 208 onto the sensor array 260 produces a corresponding waveform, which can be processed to give a measure of the applied shaft torque.

This process is complicated by three factors:

1. The applied torque and shaft rotation cause angular displacements of the slots whereas the sensor array 260 measures linear displacements;
2. The different optical magnifications of the elements 204, 206 (which may be rotating in separate planes), cause the projection of edges from the two planes to move relative to one another on the sensor array 260;

3. Non-concentric rotation of the elements 204, 206 gives an apparent variation in torque.

The edges of the slots rotate about the axis of rotation but are projected onto the linear array 260 of sensors. The edges produced by scanning the array 260 is therefore modified to simulate a curved array of sensors. However, the effective radius of the projected image is not equal to the optical radius of the disc, due to the effects of optical magnification.

Figure 24:
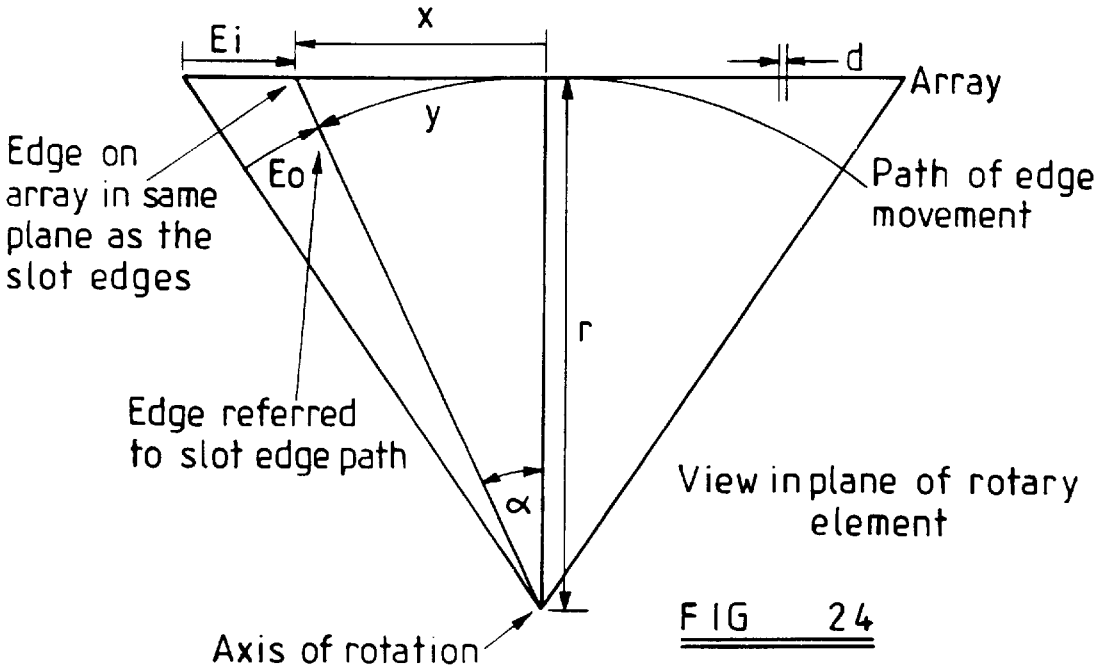
FIGS. 24 to 27 are diagrams illustrating techniques for correcting for geometry and mechanical variations.

FIG. 24 illustrates mapping of the curved slot path to a straight line in the plane of the edges.

For the sensor waveform edge positions measured from the center of the array:

$$\mathrm{Tan}\alpha = \frac{x}{r} \quad \text{and} \quad y = r\cdot\alpha$$

Therefore:

$$\alpha = \mathrm{Tan}^{-1}\left(\frac{x}{r}\right) \quad \text{so} \quad y = r\cdot\mathrm{Tan}^{-1}\left(\frac{x}{r}\right)$$

If:

Ei=Input pixel number measured from the start of the array;

Eo=Output edge position (in pixels) measured along the arc;

N=Number of pixels in the array; and d=Pixel width in mm, then:

$$x = d\cdot\left(\frac{N}{2} - Ei\right) \quad \text{and} \quad y = d\cdot\left(\frac{N}{2} - Eo\right) \quad \text{or} \quad Eo = \frac{N}{2} - \frac{y}{d}$$

Substituting gives:

$$Eo = \frac{N}{2} - \frac{r}{d}\cdot\mathrm{Tan}^{-1}\left(\frac{x}{r}\right)$$

$$Eo = \frac{N}{2} - \frac{r}{d}\cdot\mathrm{Tan}^{-1}\left(\frac{d}{r}\cdot\left(\frac{N}{2} - Ei\right)\right)$$

Figure 25:
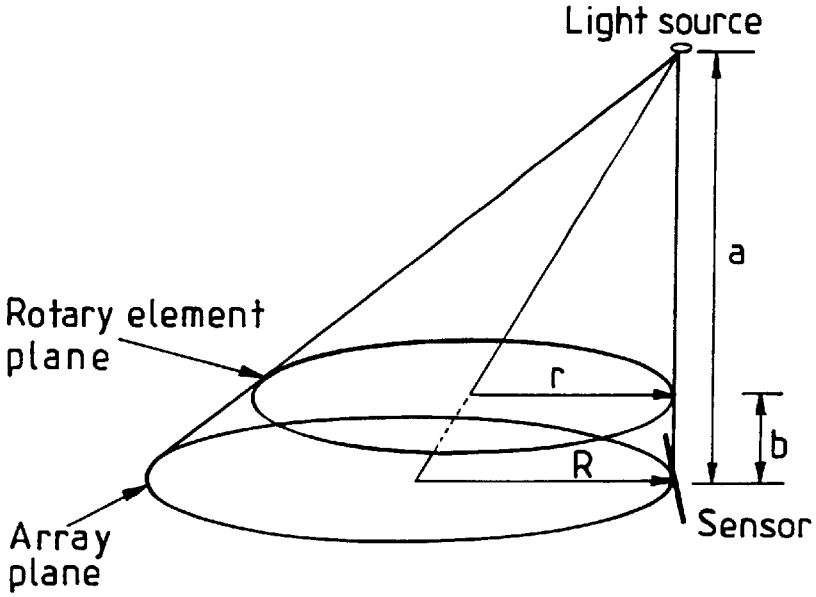

This equation uses the disc optical radius r and the input edge position Ei to obtain the mapped output edge position Eo. In practice the optical radius is increased because the light source to array distance a is greater than the light source to disc distance (a–b), as shown in FIG. 25.

The effective optical radius R in the array plane is given by:

$$\frac{R}{a} = \frac{r}{(a-b)} \quad \text{or} \quad R = \frac{a\cdot r}{(a-b)}$$

Giving a radius magnification factor Mo of:

$$Mo = \frac{a}{(a-b)}$$

This magnification factor can be determined from the designed optical component spacings but this is subject to assembly tolerances, shaft end float and any disc wobble (along the axis of the light path). The edge correction equation therefore becomes:

$$Eo = \frac{N}{2} - \frac{R}{d}\cdot\mathrm{Tan}^{-1}\left(\frac{d}{R}\cdot\left(\frac{N}{2} - Ei\right)\right)$$

Figure 26:
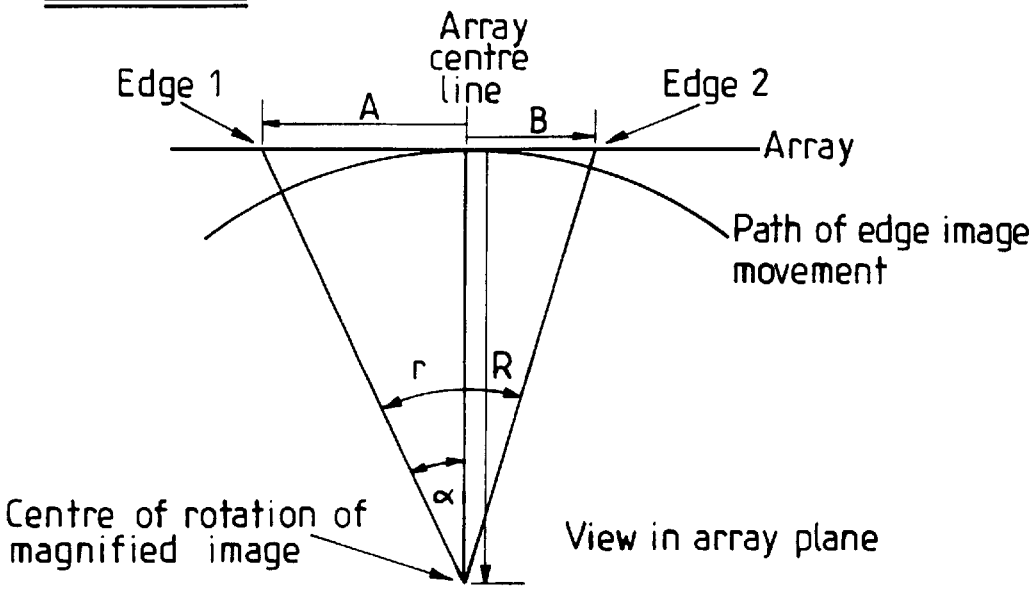

As the rotary elements are accurately made, it is possible to determine the actual optical radius automatically. In particular, details of the optical component spacings can be determined by processing the position of the slot edges which are projected onto the sensor array. If two corresponding edges of adjacent windows on the same element are simultaneously projected onto the sensor array they can be processed to give a measure of the optical magnification factor (or actual optical radius at the sensor array). FIG. 26 illustrates the projection of two such edges onto the sensor array.

By simple trigonometry:

$$\frac{A}{R}\mathrm{Tan}\alpha \quad \text{and} \quad \frac{B}{R} - \mathrm{Tan}(\gamma - \alpha)$$

Rearranging gives:

$$\alpha = \mathrm{Tan}^{-1}\left(\frac{A}{R}\right) \quad \text{and} \quad \frac{B}{R} = \frac{\mathrm{Tan}\gamma - \mathrm{Tan}\alpha}{1 + \mathrm{Tan}\alpha\cdot\mathrm{Tan}\gamma}$$

Substituting for α:

$$\frac{B}{R} = \frac{\mathrm{Tan}\gamma - \frac{A}{R}}{1 + \frac{A}{R}\cdot\mathrm{Tan}\gamma}$$

But γ is independent of optical magnification and is determined by the geometry of the rotary element.

So letting G-constant=Tanγ gives:

$$\frac{B}{R} = \frac{G - \frac{A}{R}}{1 + G\cdot\frac{A}{R}} \quad \text{Multiplying by R gives} \quad \frac{B}{R} = \frac{G\cdot R - A}{R + G\cdot A}$$

Multiplying out gives:

$$G\cdot R^2 - (A+B)\cdot R - A\cdot B\cdot G = 0$$

which has quadratic roots:

$$R = \frac{(A+B) \pm \sqrt{(A+B)^2 + 4\cdot G^2\cdot A\cdot B}}{2\cdot G}$$

which can be solved for R to provide the optical radius in the plane of the array.

The images from the two rotary elements can be used to provide a different optical radius for each element. The algorithm uses raw edges, where the different optical radii account for the parallax error between the elements.

For variations in optical radius likely to be encountered in many applications, the factor under the root sign may be approximated by k,A,B, where k is a constant.

Figure 27:
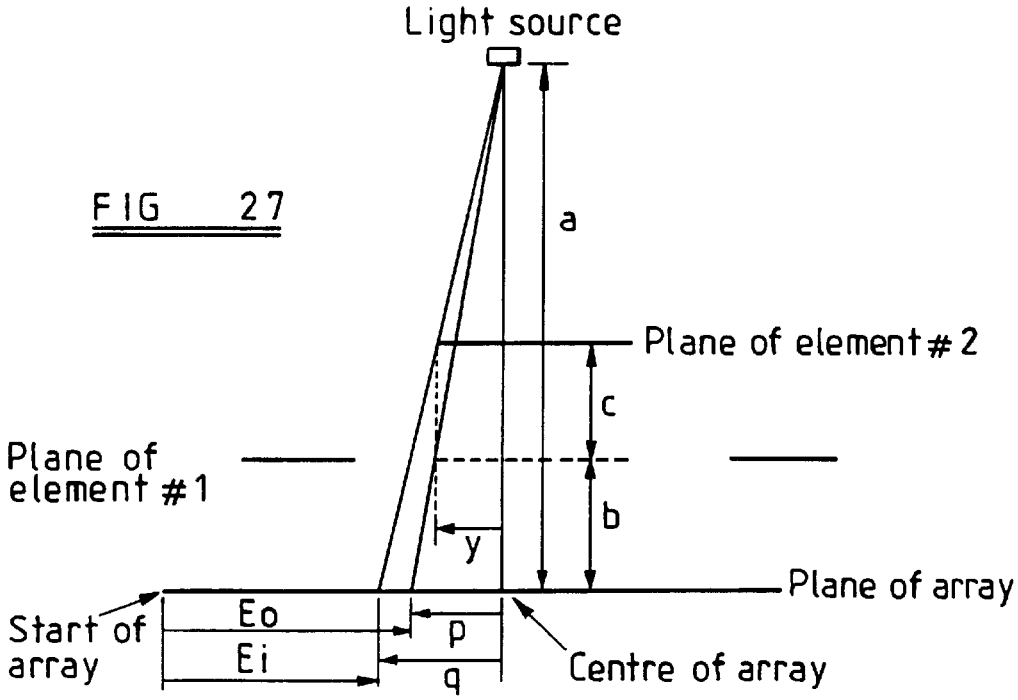

As the two torque sensing rotary elements are not necessarily in the same plane, the element nearer the light source projects a more magnified image onto the array. The image from one element is therefore scaled to equalize the image sizes before torque can be determined. FIG. 27 shows element #2 casting a larger image than element #1 and this image is consequently scaled down to stimulate the elements being coplanar.#

In FIG. 27:

a=Light source to array distance;

b=Element #1 to array distance;

c=Distance between the elements #1 and element #2 planes;

y=Distance of a typical slot edge from the array center line.

The edge of the element #2 forms an image at a distance q from the center of the array.

If the elements were coplanar, the edge would appear at a distance p from the center.

Using equal angles:

$$\frac{p}{a} = \frac{y}{(a-b)} \quad \text{and} \quad \frac{q}{a} = \frac{y}{(a-(b+c))}$$

Solving both equations for y gives:

$$y = \frac{p\cdot(a-b)}{a} \quad \text{and} \quad y = \frac{q\cdot(a-(b+c))}{a}$$

Equating and solving for p gives:

$$p = \frac{q\cdot(a-(b+c))}{a-b}$$

If:

Ei=Input edge position;

Eo=Output edge position;

N=Number of elements in array;

d=Element width, then:

$$q = d\cdot\left(\frac{N}{2} - Ei\right)$$

giving:

$$p = d\Big/\left(\frac{N}{2} - Ei\right)\left(\frac{(a-(b+c))}{(a-b)}\right)$$

Also:

$$p = d\cdot\left(\frac{N}{2} - Eo\right) \quad \text{or} \quad Eo = \frac{N}{2} - \frac{p}{d}$$

which gives:

$$Eo = \frac{N}{2} - \left(\frac{N}{2} - Ei\right)\left(\frac{(a-(b+c))}{(a-b)}\right)$$

This gives the output edge position Eo in terms of the input edge position Ei and the optical component spacings. The last term can be determined from the acquired waveform so that the required parallax correction function can be performed automatically.

The parallax term is a function of the spacing between the rotary elements and the distance between the light source and the array. The correction factor does not depend on the distance between the elements and the array as this varies the sizes of images but does not affect their relative sizes.

Assuming that the arctan correction has already been performed, the parallax correction term $P_x$ is given by:

$$P_x = \frac{(a-(b+c))}{(a-b)}$$

Then for the element #2, the period of a window on the element is given by:

$$P_{disc\#2} = \frac{N}{2}P_x\left(\frac{N}{2} - E_{last\#2}\right) - \left[\frac{N}{2} - P_x\cdot\left(\frac{N}{2} - E_{first\#2}\right)\right]$$

Simplifying:

$$P_{disc\#2}=P_x\cdot(E_{last\#2}-E_{first\#2})$$

For the element #1, the period of a window on the element is given by:

$$P_{disc\#1} = \frac{N}{2} - \left(\frac{N}{2} - E_{last\#1}\right) - \left[\frac{N}{2} - \left(\frac{N}{2} - E_{first\#1}\right)\right]$$

Simplifying:

$$P_{disc\#1}=(E_{last\#1}-E_{first\#1})$$

For the period measured from the two elements to be equal:

$$P_{disc\#2}=_{disc\#1} \text{ giving } P_x\cdot(E_{last\#2}-E_{first\#2})=(E_{last\#1}-E_{first\#1})$$

Therefore:

$$P_x = \frac{(E_{last\#1} - E_{first\#1})}{(E_{last\#2} - E_{first\#2})}$$

Thus, the ratio of the periods measured from the two rotary elements gives the relative magnification factor which is used to compensate for parallax.

Figure 28:
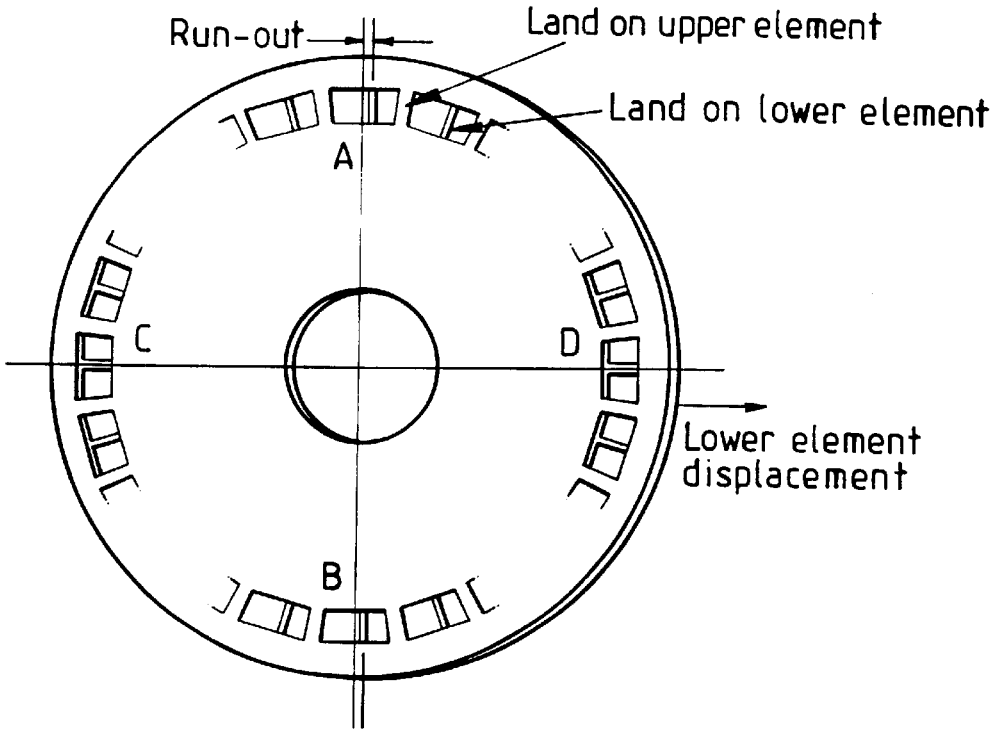
FIG. 28 illustrates the effect of runout between discs of a torque sensor.

The torque measurement is determined by the relative positions of the edges of the windows on the two rotary elements. If runout exists between the axes of rotation of the elements as illustrated in FIG. 28, a torque error will result. This error will vary cyclically as the elements rotate. When window A is above the sensor array, a positive torque error will result. This changes to a negative torque error when window B is above the sensor array. There is no runout error when windows C and D are over the sensor array.

By disposing two diametrically opposed sensor arrays, for instance, under windows A and B and averaging the torque readings, the effect of disc runout is cancelled. This function assumes that arctan and parallax corrections have already been correctly applied.

The normal sequence for using the auto-arctan, auto-parallax and run-out compensation described hereinbefore is as follows:

1. Measure the A and B distances from the center of the array for both rotary elements;
2. Calculate the optical radii for both elements;
3. Apply the arctan correction to all slot edges which will be used for subsequent calculations;
4. Use these arctan corrected edges to measure the window period for both elements;
5. Find the ratio of the two periods to size $P_x$;
6. Use $P_x$ to parallax scale down (towards the centre of the array) the edges from element closer to the light source;
7. Use the parallax corrected edges to calculate torque; and 8. Average the calculated torque result for the two sensor arrays and to give runout corrected torque.

It is thus possible to correct automatically for the geometry of a torque sensor and for mechanical variations or manufacturing tolerances. The accuracy of such sensors can therefore be improved and the cost of manufacture reduced.

We claim:

1. An optical displacement sensor comprising a source of optical radiation, an array of radiation detectors, and first and second elements, each of which comprises alternating first and second regions, the first regions having greater optical transmissivities than the optical transmissivities of the second regions, each of the first and second elements being movable so that the first and second regions pass between the source and the array so as to modulate the radiation falling on different regions of the array, the improvement wherein an image of said first and second regions of the first and second elements is formed on the array which image has light and dark portions with edges and the sensor also includes a data processor connected to the array to receive therefrom signals representing the intensity of radiation falling on each detector of the array, said data processor operating to determine the relative positions of the first and second elements by determining the position of at least one edge of a dark portion of the image caused by one of the second regions of one element relative to at least one edge of a dark portion of the image caused by one of the second regions of the other element.

2. A sensor as claimed in claim 1, in which the source comprises a point source.

3. A sensor as claimed in claim 2, in which the source further comprises a diffuser for diffusing radiation from the point source.

4. A sensor as claimed in claim 1, in which the array comprises a linear array.

5. A sensor as claimed in claim 1, in which the radiation detectors are contiguous.

6. A sensor as claimed in claim 1, in which the first and second elements are rotary elements.

7. A sensor as claimed in claim 6, further comprising a further source of optical radiation and a further array of radiation detectors disposed diametrically opposite the source and the array.

8. A sensor as claimed in claim 1, in which the first and second regions of the first and second elements have constant equal spatial periods.

9. A sensor as claimed in claim 1, in which the first and second regions of each of the first and second elements have a constant mark/space ratio.

10. A sensor as claimed in claim 9, in which the mark/space ratio of the first and second regions of the first element is equal to the mark/space ratio of the first and second regions of the second element.

11. A sensor as claimed in claim 1, in which the first regions comprise slots formed in the first and second elements and the second regions comprise opaque portions of the first and second elements disposed between the slots.

12. A sensor as claimed in claim 1, in which the first and second elements are constrained to prevent relative movement therebetween such that the second regions of the first and second elements overlap between the source and the array.

13. A sensor as claimed in claim 1, in which the first and second elements are separably interconnected.

14. A sensor as claimed in claim 13, in which the first and second elements are formed integrally with breakable interconnections therebetween.

15. A sensor as claimed in claim 13, in which the first and second elements are coplanar.

16. A sensor as claimed in claim 15, in which the first and second elements comprise inner and outer portions, respectively, of an annulus or a disc.

17. A torque sensor comprising a sensor as claimed in claim 1 and a resilient coupling between the first and second elements.

18. A sensor as claimed in claim 1, in which said data processor operates to determine the position of at least one edge of the dark portion of the image caused by one of the second regions of one element relative to at least one edge of dark portions of the image caused by two adjacent ones of the second regions of the other element.

19. A sensor as claimed in claim 1 in which said data processor detects locations in the image on the array of transitions between a radiation level greater than a predetermined level and a radiation level less than the predetermined level.

20. A sensor as claimed in claim 1, in which the first and second regions and the array are arranged such that there are at least five transitions in the image on the array irrespective of the positions of the first and second elements.

21. A sensor as claimed in claim 1, in which the first and second elements are rotary elements and further comprising a further source of optical radiation and a further array of radiation detectors disposed diametrically opposite the source and the array.

22. A torque sensor comprising a sensor as claimed in claim 1 and a resilient coupling between said first and second elements of the sensor.

23. An optical displacement sensor comprising a source of optical radiation, an array of radiation detectors, first and second elements, each of which comprises alternating first and second regions, the first regions having greater optical transmissivities than the optical transmissivities of the second regions, each of the first and second elements being movable so that the first and second regions pass between the source and the array, and a detector for detecting locations on the array of transitions between a radiation level greater than a predetermined level and a radiation level less than the predetermined level.

24. A sensor as claimed in claim 23, in which the first and second regions and the array are arranged such that there are at least five transitions on the array irrespective of the positions of the first and second elements.

25. A sensor as claimed in claim 23, further comprising a processor for processing the locations to determine relative displacement of the first and second elements.

26. A sensor as claimed in claim 25, in which the processor is arranged to determine the relative displacement as a function of the ratio of the distance between first and sixth transitions and the distance between first and fourth or third and sixth transitions.

27. An optical displacement sensor comprising a source of optical radiation, an array of radiation detectors, and first and second elements, each of which comprises alternating first and second regions, the first regions having greater optical transmissivities than the optical transmissivities of the second regions, said first element comprising n second regions, (n−1) of which have a first width and the other of which has a second width different from the first width, each of the first and second elements being movable so that the first and second regions pass between the source and the array.

28. A sensor as claimed in claim 27, in which the second element comprises n second regions, (n−2) of which have a third width and the other two of which have a fourth width different from the third width, the sum of the first and third widths being equal to the sum of the second width and twice the fourth width, the other of the second regions of the first element being disposed between the other two of the second regions of the second element in the duration of movement of the first and second elements.

29. An optical displacement sensor comprising a source of optical radiation, an array of radiation detectors, first and second rotary elements, each of which comprises alternating first and second regions, the first regions having greater optical transmissivities than the optical transmissivities of the second regions, each of the first and second elements being movable so that the first and second regions pass between the source and the array, and a data processor connected to the array for transforming positions of images of the first and second regions to corresponding rotary positions of the first and second regions.

*30. An optical displacement sensor comprising a source of optical radiation, and array of radiation detectors, and first and second elements, each of which comprises alternating first and second regions, the first and second regions having different optical characteristics, each of the first and second elements being movable so that the first and second regions are exposed to optical radiation from said source and pass by said detector array so as to modulate the radiation falling on different regions of the array, the improvement wherein an image of said first and second regions of the first and second elements are formed on the array which image has light and dark portions with edges and the sensor also includes a data processor connected to the array to receive therefrom signals representing the intensity of radiation falling on each detector of the array, said data processor operating to determine the relative positions of the first and second elements by determining the position of at least one edge of the dark portion of the image caused by one of the second regions of one element relative to at least one edge of a dark portion of the image caused by one of the second regions of the other element.*

* * * * *